Feb. 16, 1971    J. FOURNET ET AL    3,564,083
FORMATION OF FIBROUS GRANULES

Filed March 27, 1969    5 Sheets-Sheet 1

Inventors:
Jean Fournet
GUY J. JACQUELIN

By: Spencer & Kaye

Attorneys

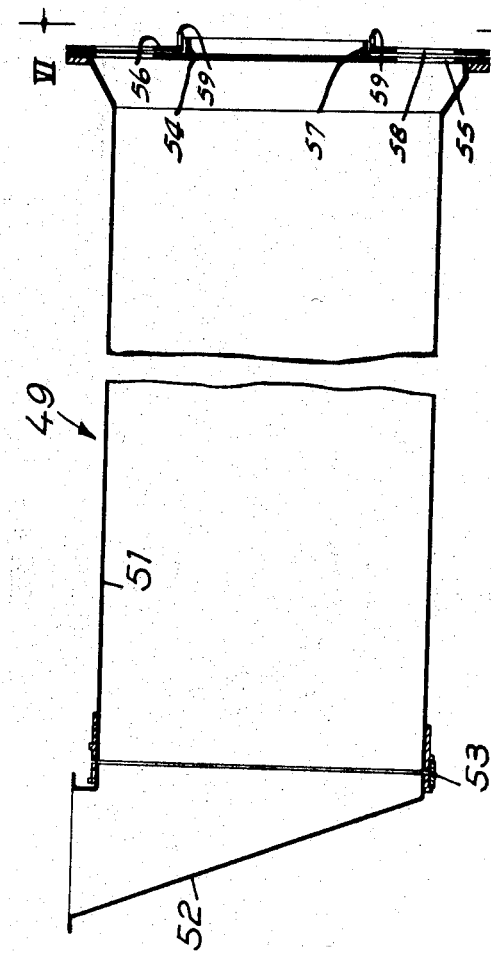
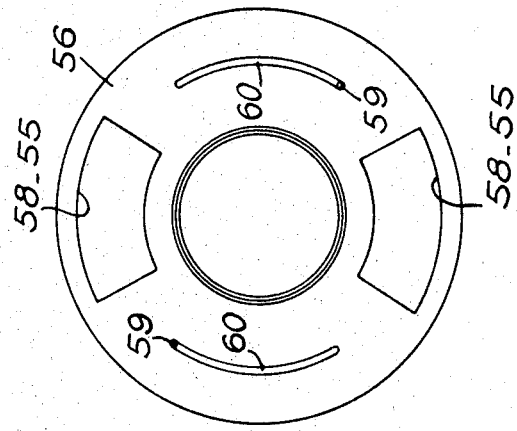

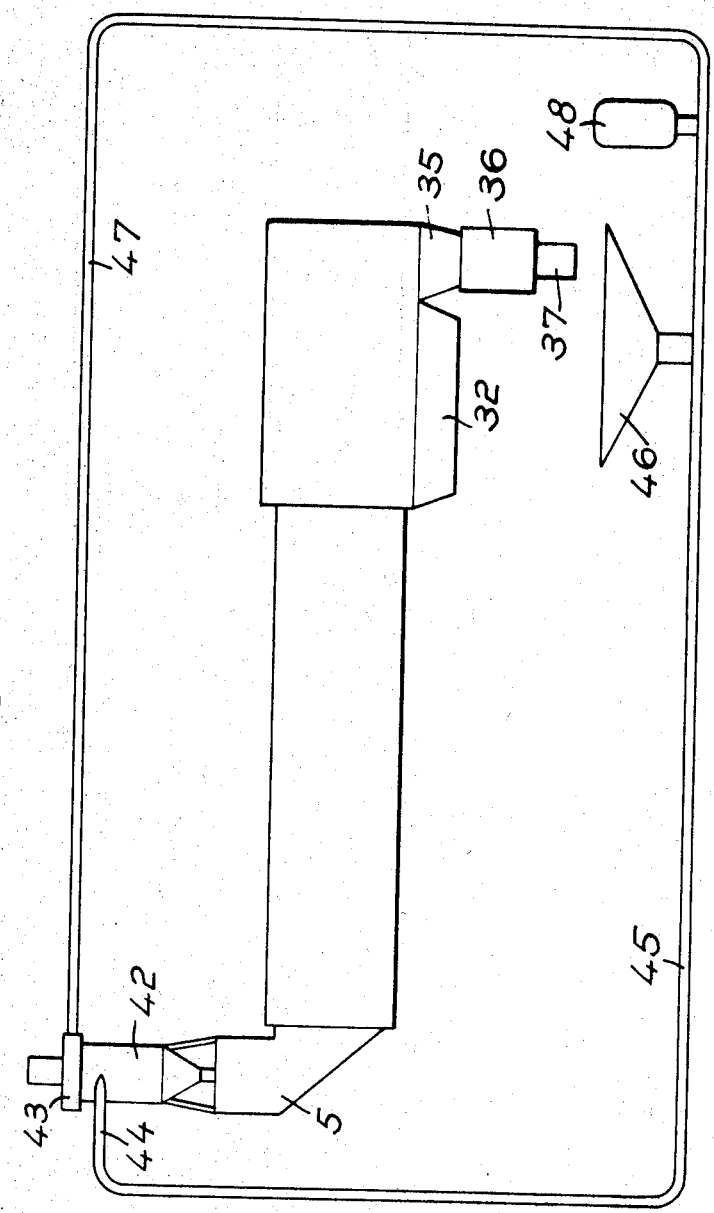

United States Patent Office 3,564,083
Patented Feb. 16, 1971

3,564,083
FORMATION OF FIBROUS GRANULES
Jean Fournet, Saint-Romain-en-Gal, and Guy J. Jacquelin, Grenoble, France, assignors to Societe d'Exploitation des Brevets Granofibre-Sebreg, Paris, France, a company of France
Filed Mar. 27, 1969, Ser. No. 810,960
Claims priority, application France, Mar. 27, 1968, 145,632
Int. Cl. B01j 2/12
U.S. Cl. 264—37      12 Claims

ABSTRACT OF THE DISCLOSURE

A method of forming granules of a fibrous texture and according to the invention, fibres having a certain moisture content are collected together and agitated in a dry state in order to form roughly organised fibre masses which are then placed in suspension in a liquid, this suspension then being subjected to turbulence produced by a rotational movement which, if desired, may be combined with a pulsing movement.

---

In a large number of cases, use is made of natural (for example wood) or synthetic fibres which are not individualised but regrouped and organised so as to form discrete particles.

Among these particles it is conventional to use granules obtained by a wet method. They are homogeneous in structure and have isotropic properties. Thei behaviour and cohesion are perfect throughout their entire mass since it is difficult to detach any fibres therefrom. In addition, they are very light, supple and elastic and have open pores.

A method whereby such granules are manufactured is described in French Pat. 1,422,835 and consists in placing the fibres in suspension in a liquid and subjecting this suspension to slight turbulence by rotating it so as to produce speed gradients such that the fibers, which are drawn into movement in which they both circulate and rotate about themselves differently from that of neighboring fibres, tend to adhere to the latter when they meet, so as to form granules. A process of this type is very simply effected, for example, in a cylindrical tank which is filled to about two-thirds capacity with the suspension and rotated about its substantially horizontal axis.

The process in question is not advantageous from the economic point of view when intended for use on a large industrial scale. The duration of the wet treatment is relatively long; since it takes between eight and ten hours, the consumption of power per unit of weight of granules is considerable and the cost of a plant in relation to optimum production is heavy. Consequently, the cost per unit of weight of granules made from wood fibres is too high and cannot compete with substitute products.

The above wet granulation process has been improved and is described in commonly assigned U.S. patent application SN 724,427, filed Apr. 26, 1968 (French patent application 104,408, Apr. 27, 1967).

This improved process consists of combining a pulsing movement which produces an ebb and flow with a general rotary movement of a suspension The simplest device which makes this improved process possible comprises a fixed tank in which a cylindrical rotor, mounted eccentrically relatively to its axis of rotation is located the suspension to be treated partly filling at least the cavity between the tank and the rotor.

This improved process has the advantage over the one previously referred to of reducing the duration of treatment which may be cut down to about three hours. It still has the disadvantage, however, of being very costly since the plant is expensive, the power consumption high and the yield usually insufficient, since it is necessary to effect a considerable amount of recycling.

During the course of research work in another connection, we have carried out tests using a dry method. These tests consisted of agitating a mass of fibres in the absence of any vector liquid. In fact, the fibres are not absolutely dry, their water content being between 5 and 35% by weight. It was found possible to obtain a fibrous mass but the dimensions were not uniform and their adherence proved very weak. Production costs, on the other hand, were very reasonable.

Granules obtained by a wet method are extremely important from the point of view of the properties they possess but they are too expensive because of the high cost of the process whereby they are obtained and because of the restriction in the choice of basic fibres which must be relatively long (2 to 3 mm.) and of good quality, the short fibers (0.5 to 1.5 mm.) of deciduous woods, for instance, being more difficult to process. Similarly, fibrous masses obtained by the dry method are cheap, and they are not suitable for industrial applications because of their lack of cohesion.

A number of experiments have been carried out and have made it possible to develop the new process of the present invention.

We have also carried out tests connected with the wet method and noticed that a considerable portion of the time involved in this process was used for the creation of initial granules produced by the adhesion of a number of fibres, so that the actual granulation process, which consists of increasing the size of the initial granules, actually lasts for a much shorter time than was thought.

Moreover, it was found that the initial granules are not all formed simultaneously; the first granules formed give rise to granules which are larger than those obtained from the last ones formed. The initial formation of the desired structures is encouraged if the concentration of fibres in the suspension is relatively low while the growth of these granules, i.e. the granulation process proper, is speeded up if the concentration of fibres in the said suspension is fairly high. These conditions are, moreover, practically impossible to achieve in a simple wet process on an industrial scale.

If we now turn to the dry method, which was the subject of experiments that we conducted, it was found that the fibrous masses are not sufficiently coherent and thus that the fibres which constitute them become detached too easily.

We then conceived the idea of placing the fibrous masses in question in suspension in a liquid and treating them by the wet process. This apparently absurd idea consists of building up dry fibrous structures in order to destroy them subsequently in a suspension and then to reconstruct them with a view to expediting the preparation of granules which are just as solid. Two phenomena were noted according to the size of the concentration of the suspension.

If the concentration of this suspension of fibrous mass is relatively low and the medium fairly fluid, e.g. containing between 2 and 7% by weight of dry resinous fibres, it was found that the masses tended to liberate both single fibres and groups of fibres.

In other words, in the suspension of fibrous masses we find, from the very beginning of the wet process, basic fibres and initial granules formed by groups obtained beforehand by the dry method. During this process, the initial granules become more or less consolidated as a result of a densifying effect produces by shocks which occur during the course of their movement in the fluid; while they are thus being compacted, they trap free fibres by tangential interlacing.

The structure of the granules obtained may be described approximately as follows: Each granule comprises a core produced by the dry method and, about this core, a cocoon of tangentially imbricated fibres. This structure is less homogeneous than that of the granules obtained solely by the wet process. In fact, the fibres in the "core" are to a large extent imbricated in lines, the direction of which is mainly radial, while in a "cocoon" fibres are mainly tangentially interlaced.

On the other hand, if the concentration of the abovementioned suspension of fibrous masses is relatively high and the medium fairly thick, e.g. containing between 10 and 15% by weight of dry, resinous fibres, there is less vector liquid liable to detach the fibres from the masses. Under the effects of shocks on impact, which occur more frequently in a denser medium, the fibrous masses tend to become compacted and to be consolidated by a greater force of imbrication of tht fibres and fibre lines.

The structure of the granules thus obtained differs from that of those described above in that a core, in which the fibres are mainly radial, is predominant. Nonetheless, the surface fibres are, in this case too, mainly tangential, not due so much to an addition from outside but to a re-orienting of the projecting peripheral fibres under the effect of mutual friction.

The obtained granules always show good adhesive properties, regardless of whether the wet processing of fibrous masses is carried out at high or low concentration.

However, in the case of wood fibres, as the concentration of the fibrous masses increases, the cohesion of the elements within the granule becomes greater. In fact, much less dust and many less fibres become detached during processes after drying. This is particularly due to the preservation of the soluble elements of wood which, instead of being eliminated with the liquid, remain in the granules and reinforce the connections.

Moreover, it was found that the greater the concentration of the fibrous masses, the greater is the density of the granules. For example, in the case of fibrous masses of sea-pine, if the concentration of the fibrous masses in the liquid varies between 5% and 12% dry weight, the density of the dry granules obtained varies between 35 and 55 kg./cu. cm. loose.

Finally, if the wet processing of the suspension of fibrous masses is effected in high concentration, the duration of the treatment is shorter and the yield per unit of volume of suspension is higher than when the treatment is carried out with a low concentration.

By selecting the concentration of fibrous masses, it is possible to influence the structure of the granules obtained, their density, cohesion, grain size and properties resulting therefrom.

On the other hand, the method of the invention makes it possible to use less noble fibres more easily. It is even possible to diversify the structures and the properties of the granules by using such fibres for the core (short fibres of deciduous wood, waste paper or the like) and more noble fibres for the periphery (long sea-line fibres, synthetic fibres or the like).

It is an object of the invention to produce granules at low cost, by reducing the overall duration of the process, improving its effectiveness and increasing the yield per unit of time, while also reducing the capacity of the plant for a given production figure and lowering the cost, and, finally, by reducing the consumption of power per unit of weight produced. Another object of the invention is to obtain granules of a satisfactory quality suitable for the application for which they are required. In fact, the method of the invention makes it possible to diversify the structures and properties of the granules by influencing the nature of the basic fibres and the processing method, certain parameters of which, such as the concentration of the suspension, the duration of the dry treatment vis-a-vis that of the wet treatment, etc., may be varied.

To this end and according to the invention, the method consists of collecting together the fibres having a moisture content and agitating them in a dry state in order to form fibrous masses which are roughly organised, in placing these fibrous masses in suspension in a liquid, if desired in conjunction with other products, and in subjecting the suspension, in a conventional manner to a directed turbulence produced by a rotational movement which may be combined with a pulsing movement.

In a particularly advantageous embodiment of the invention, the dry process consists of subjecting all fibres to a rotary movement about a substantially horizontal axis, in order to induce, within the mass of fibres, a combined rolling and dropping movement which causes the formation of discreet fibrous masses.

The method also consists of classifying the material treated by the dry process in order to separate fibrous masses of suitable size, which are subsequently treated by the wet process, from powders, free fibres and fibrous masses which are too large and which are recycled for dry-treatment with new fibres, the excessively large fibrous masses first being broken up.

The invention achieves its aim by these features. The production of granules thus not only possesses the advantages described above but a number of additional advantages.

In particular, since the wet-treatment is used on semifinished products (the sorted fibrous masses obtained by the dry process), it is no longer necessary to recycle the liquid phase. On the other hand, it is vital that the material discarded during the sorting process be recycled after dry treatment but this is much simpler since the mass to be recycled is smaller and can easily be conveyed pneumatically. Consequently, the complete granulation plant of the invention is much simpler and the cost of a given production per day less than in the case of a plant using only the wet process.

Moreover, the consumption of liquid (generally water) per unit of weight of granules produced is very low as compared with what it would be in a process using only the wet treatment. It may even be negligible if the water is recycled. Thus the important problem of the removal and treatment of polluted water is substantially avoided.

The invention also extends to the granulation plant which, according to the invention, comprises at least one rotary tunnel for dry treatment and at least one granulation unit for the wet process which is supplied from material from the tunnel.

Between the dry process tunnel and the wet process granulation unit the plant comprises a sorting device which is preferably of the rotary type, the input of which is connected to the tunnel while an intermediate outlet is connected to the granulation unit, an outlet for the finished products and an outlet from the sorting device for fibrous masses which are too large.

To the suspension in the wet process granulation unit further substances may be added. These include charges, bonding agents, adjuvants and colouring agents. The adjuvants are, e.g., for flame proofing, for water-proofing or fungicides.

Various other features of the unit will become clear from the detailed description which follows and which refers to the accompanying drawings, in which:

FIG. 5 shows a view, similar to that in FIG. 2, of the wet-process granulation unit.

FIG. 6 shows a side elevational view along the line VI—VI in FIG. 5.

FIG. 7 shows a diagram of the pneumatic circuit produced for recycling after the dry process.

Figure 1:
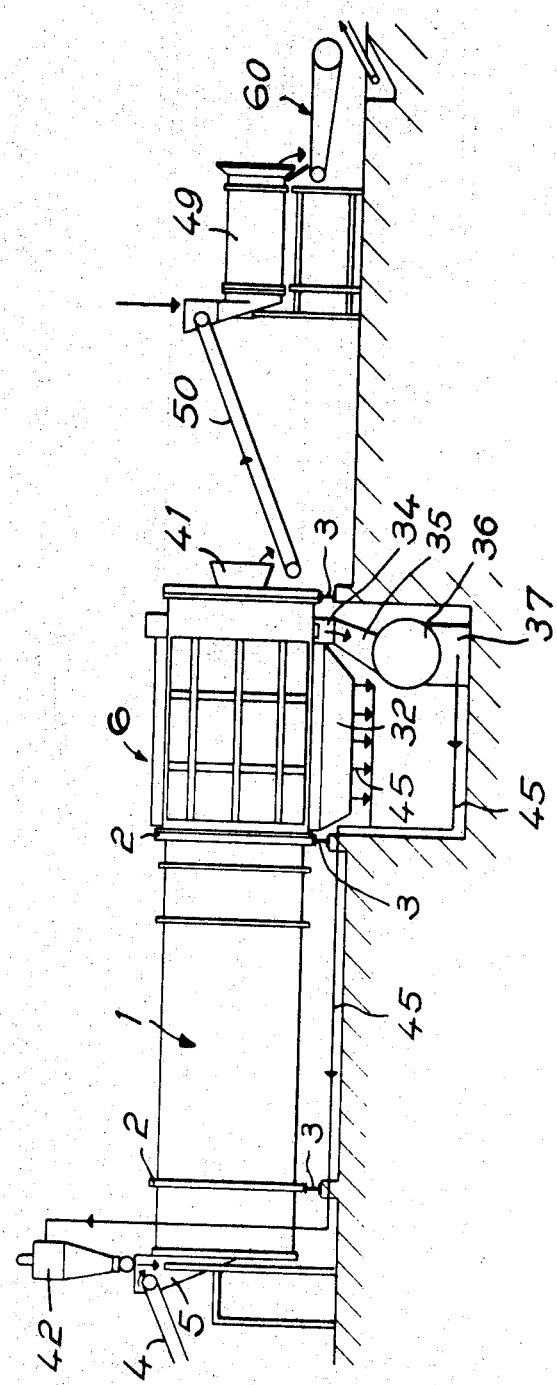
FIG. 1 shows a diagrammatic elevational view of a plant according to the invention.

Referring now to the drawings, as is clearly shown in FIG. 1, a plant according to the invention comprises a rotary tunnel 1 provided for dry-processing fibres. This tunnel is preferably a cylinder, the axis of which is substantially horizontal. It is freely mounted and driven in continuous rotation about its axis. To this end, it may be provided on the outside with circular ball races 2 which rest on free rollers 3 in a frame. On the other hand, it is connected to a drive unit, such as a motor, through a transmission system which may be of the belt, chain, pinion, friction roller or other type.

The fibres conveyed by a conveyor 4 are tipped by a fixed distributor chute 5 into the tunnel 1 at its upper end. The fibres located in the rotating tunnel 1 are caused to rotate by the said tunnel but since they have the tendency, under the effect of gravity, to drop back again, the result is that the fibres tend to move downwards in a rotary movement, thus producing aggregations of fibres. In fact, the downward circulation due to the weight is less rapid than the rise induced by the tunnel so that the aggregations of fibres move upwards and end by being passed down the chute. During the succession of rising and falling movement, the aggregations become stronger or break up, depending upon whether the fibres adhere strongly or weakly to one another. At the end of the process the result is a mixture of free fibres and powders with uniform fibrous masses adhering weakly together.

The so-called "dry" treatment effected in tunnel 1 may be improved by injecting water vapour into the tunnel to remoisten the fibres and reheat them. It is also possible to pulverise other products which speed up and/or encourage dry granulation.

The internal surface of the tunnel 1 may be smooth. It may also be provided with internal projections such as longitudinal grooves in order to encourage the raising of the fibres.

Moreover, it may prove desirable to intensify the dry process. To this end the axis of rotation of the tunnel 1 may be made eccentric relatively to its geometric axis, merely by arranging the raceways 2 eccentrically.

The tunnel 1, shown diagrammatically in the drawing, is designed for use in a continuous process and there is thus an advantage in making it fairly long and providing internal forward drive means. These may take the form of an Archimedean screw arranged coaxially or by helical internal grooves. Whatever the means employed, the fibrous mass being treated moves in a longitudinal direction. Upstream it is constituted solely of free fibres, and downstream is completely enriched with fibrous masses.

At its downstream end, the dry processing tunnel 1 is coupled to a sorting device 6 which may be of any type, as long as it is able to separate products in powdered form, free fibres and excessively large fibrous masses from fibrous masses of suitable size for wet treatment.

In the embodiment shown in FIGS. 1 to 4, sorting device 6 of the rotary jigger type. It comprises two concentric, cylindrical screens 7 and 8, secured to a frame 9. The latter is connected to ball races 2, described above, by means of flexible members 10 which constitute shock absorbers and may take the form of rubber sleeves. It may be coupled to a rotary drive but it would appear more advantageous for it to be driven by the tunnel 1; to this end of one the ball races 2 is common to said tunnel and said sorting device. Finally, frame 9, acting as a support, cooperates with vibrating members so that the products to be sorted are subjected to a combined rotary and vibratory movement.

The size of the meshes in the internal screen 7 is larger than that of the meshes in the external screen 8. Thus, the excessively large fibrous masses are retained by the screen 7 while the fibrous masses of suitable size and the fine products pass through it. Similarly, the fibrous masses of suitable size are retained by the screen 8 while the fine products (powders, free fibres, etc.) pass through it.

The center compartment 11 defined in the sorting device 6 by the screen 7 is connected at the upstream end to rotary tunnel 1 so that it is supplied from the latter with fibres. To this end, the downstream end of tunnel 1 may take the form shown in FIGS. 2 and 4.

The tunnel 1 is partly closed by a transverse wall 12 made integral by any suitable means with its cylindrical wall. The said transverse wall defines a window 13 (FIGS. 2 and 4) which extends to the periphery and is shaped like the sector of a circle. The window 13 normally effects a connection in tunnel 1 between its internal processing cavity 14 and a downstream chamber 15. In fact, the transfer of products from the cavity 14 to the chamber 15 is intermittent and is effected when the window 13 arrives at the lower portion of its circular path. The quantity of products transferred at each rotation obviously depends on the free diameter of the window 13. There is, moreover, some advantage to be gained in making it possible for the amount to be regulated.

To this end a flap 16 (FIGS. 2 and 3) is applied against the wall 12 and mounted pivotably about a shaft 17 in the said wall which is preferably arranged centrally. The flap 16 is sufficiently large to be able to close the window 13 completely in one of its positions. However, by pivoting the flap, it is possible to free a greater or smaller portion of window 13. In the embodiment illustrated, the pivotal movement is controlled by means of a cable 18 which extends partly into and partly out of the tunnel. This cable is guided on idler pulleys 19 carried by the tunnel. Between the two pulleys one end of the cable is attached directly to a radial extension of flap 16 while the other end of the cable is connected to the extension by means of a spring 21 which compensates the variations in length which result from the circular path followed by the point of attachment. Outside the tunnel, the cable cooperates with drive means which causes the pivotal movement of the flap. In the example shown, the said drive means takes the form of a pinion 22 which meshes with a chain 23 which replaces a portion of the cable 18. The pinion 22 is mounted idly about a fixed shaft 24 of the tunnel and is also connected to a tangential wheel 25 which engages with a screw 26 driven by a hand wheel 27.

Obviously, the transverse wall 12 may be provided with more than one adjustable aperture, each of which is formed by a window 13 and a closure flap 16.

Figure 2:
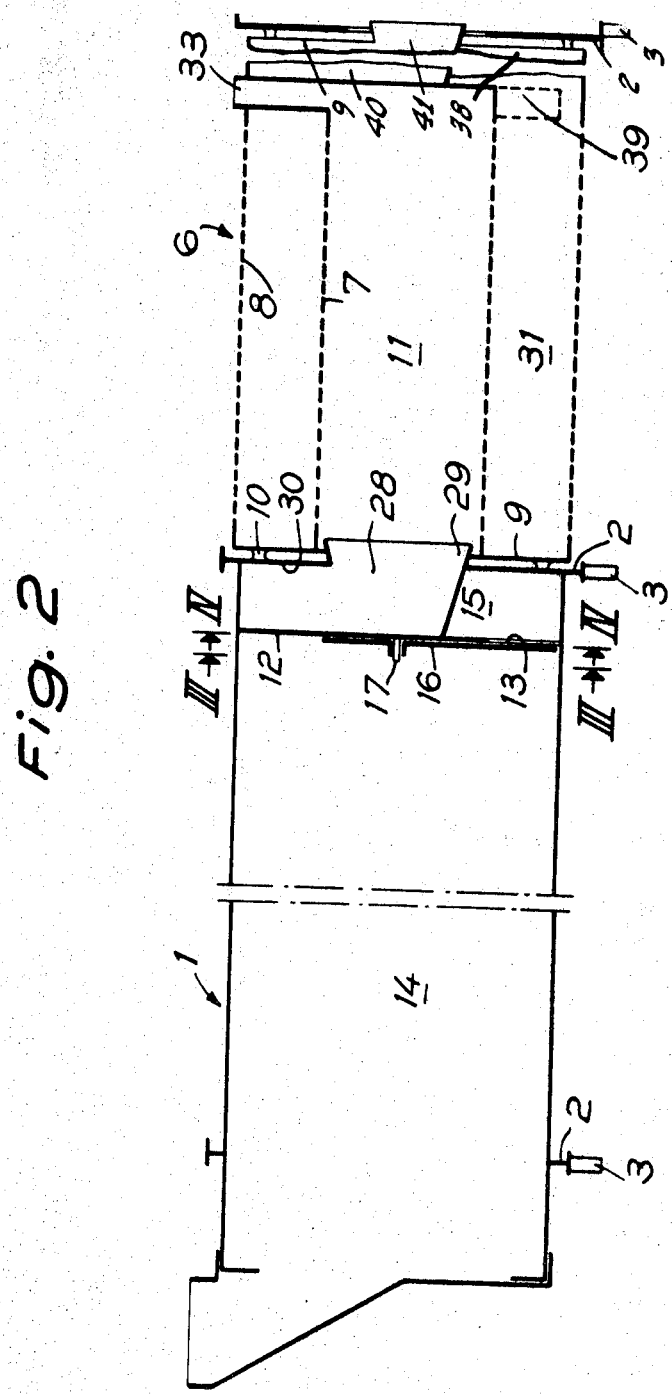
FIG. 2 shows a longitudinal section, also shown in diagrammatic form, of the dry process tunnel and the rotary sorting device.
Figure 3:
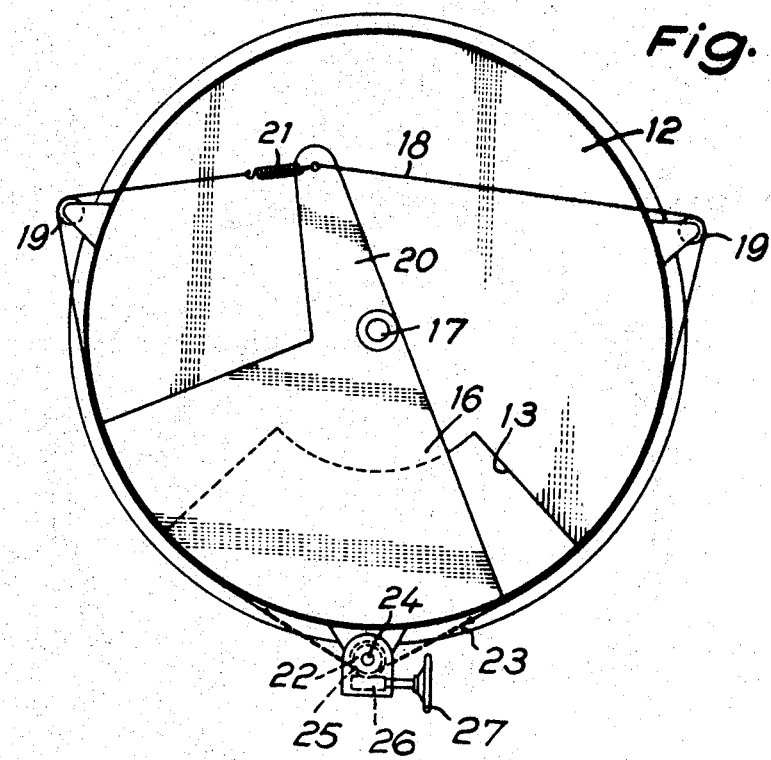
FIGS. 3 and 4 show cross-sectional views on a larger scale along the line III—III and IV—IV of FIG. 2, respectively.
Figure 4:
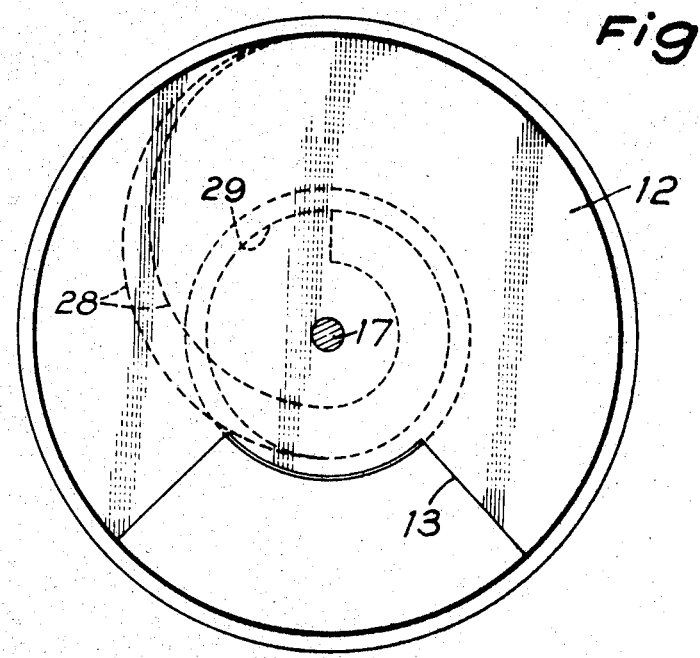

In order to discharge the products which reach the chamber 15 into the internal compartment 11 of the sorting device, the tunnel may be provided with a discharge scoop 28 shown in FIGS. 2 and 4. This scoop takes the form of a helically shaped piece of sheet metal extending from a center outlet aperture 29 of chamber 15 to the peripheral wall of the chamber. This member is secured to transverse wall 12 and to an annular end wall 30. When tunnel 1 rotates, the products which have reached chamber 15 move about their own axes and remain on the floor of said tunnel. At each rotation they are caught by the scoop 28 which, by virtue of its spiral shape, conveys them towards the center and in an axial direction. These products thus reach aperture 29 and fall into compartment 11 of the sorting device 6.

Under the effect of the rotation and vibration applied to this device, the products contained in the center compartment 11 are agitated and move in an axial direction. At the same time, while the fibrous masses which are too large remain in this internal compartment 11, the fibrous masses of suitable size pass through screen 7 and accumulate in peripheral compartment 31 while also moving in an axial direction.

The products which are too fine pass successively through screens 7 and 8 and are collected in a vat 32 (FIG. 1).

As shown in FIG. 2, center compartment 11 is connected to the outside at the downstream end by means of at least one radial passage 33 (three in the example shown) which is integral with frame 9. These passages have their outlet in a fixed collector 34 (FIG. 1) and the fibrous masses which are too large, which are thus collected, are conveyed by gravity into a conduit 35 which feeds a break-up device 36. This advantageously takes the form of a rotary carder. The fibres obtained then drop into a chute 37.

FIG. 2 also shows peripheral compartment 31 which is externally connected through a downstream chamber 38. The connection between the compartment 31 and the latter chamber is ensured by passages 39 provided between passages 33. In other words, the fibrous masses of suitable size reach the chamber 38 and tend to accumulate on the floor thereof. In fact, they are periodically removed by a discharge scoop 40 identical with the scoop 28. At each rotation scoop 40 collects said masses and conveys them towards the center and downstream where there is a center orifice 41. The fibrous masses which pass through the aperture 41 are subsequently wet-processed. Since they have been thoroughly graded, the wet process may now be carried out without any recycling.

On the other hand, the fine products which reach the vat 32 and chute 37 must be recycled, i.e. conveyed back into the tunnel 1.

To this end, according to the embodiment shown diagrammatically in FIG. 7, a cyclone 42 is mounted above distributor chute 5. This cyclone comprises a hollow body in which turbulence is produced by means of a fan 43 located thereabove. The upper part of the cyclone body is provided with a tangential input tube 44 connected, through a passage 45 which constitutes a pneumatic conveyor system, to a rotary distributor 46 which is fed with fibres or other fine products by the carder output chute 37 and the vat 45. The fibres are thus conveyed in the body of the cyclone and are held in suspension in a current of air. Under the effect of gravity they fall to the bottom of the cyclone 42 whence they are removed to chute 5 by means of an extractor screen which is preferably of the rotary type. This screen is thus composed of a rotor provided with blades which remove the fibres from the cyclone and convey them to the chute. However, the distribution of these blades is such as to ensure that the cyclone remains sealed. The pneumatic recycling circuit may be used in the manner described above but it is necessary to provide, at the outlet of fan 43, a dust extractor. In order to avoid this, the outlet tube of fan 43 may be connected, by piping 47, to the conveyor 45, so as to form a closed circuit. In this case, it is necessary to provide, upstream of the rotary distributor 46, a decompression sleeve 48.

The fibrous masses of suitable size (e.g. those between 3 and 10 mm.) which are discharged through output aperture 41 of grading device 6 serve to feed a granulation unit 49 which utilises the wet method. This unit may be connected to the assembly constituted by tunnel 1 and grader 6 or may be separate therefrom. In the latter case, which is illustrated in FIG. 1, a conveyor 50 takes the fibrous mass from grading device 6 to granulation unit 49.

The granulation unit 49 utilising the wet method may be of the intermittently or continuously operating type and may thus take the form of any of the embodiments described in French Pat. 1,422,835 or French patent application 104,408 mentioned above.

In the embodiment shown in FIGS. 5 and 6, unit 49 takes the form of a cylindrical tank 51 provided with ball races which bear on idle rollers and with a drive system. At its upper end tank 51 is open and discharges laterally into a feed vat 52 above which is a conveyor 50.

The vat 52 is fixed; in order to ensure a seal between the vat and the rotary tank, the slight gap existing between them is closed by a strip of leather 53 which spans them and surrounds them over almost all their periphery, the said leather band being kept taut.

The downstream end of rotating tank 51 is closed by a solid base 54. However, in order to enable the granules formed to be removed, this base is provided, in the embodiments shown, with two apertures 55 which are diametrically opposed and located on the periphery, the said apertures being in the form of sectors of a circle. Thus, at each rotation of the tank 1, granules are discharged twice, i.e. through each aperture in succession. It may be of advantage to regulate the amount removed and to this end base 54 is covered by a plate 56 which is centered by means of a flange on the base. The plate 56 is also provided with two windows 58 which may be brought into register with windows 55 when the diameter of the passage is at a maximum. In order to reduce the passage diameter, it is necessary merely to pivot plate 56 relatively to base 54 and to secure them relatively to each other. To this end, base 54 is provided with pins 59 which pass through curved slots 60 in said plate and cooperate with locknuts.

The suspension leaving unit 49 through the apertures 55 and 58 passes into a drainage unit 60 (FIG. 1) such as that described in the applicant's French patent application 104,409 of Apr. 27, 1967.

The invention is not limited to the way of carrying out the method and to the embodiment of the production plant herein illustrated and described in detail since various modifications may be made thereto without departing from the scope of the invention.

We claim:

1. A method for forming granules having a fibrous texture, which method comprises a dry process followed by a wet process, the dry process comprising collecting fibres having a moisture content between 5 and 35 percent by weight and agitating the fibres in a dry state to form irregular fibrous masses, and the wet process comprising placing the fibrous masses in suspension in a liquid and forming said fibrous masses into granules by subjecting the resultant suspension to a directed turbulence produced by a rotational movement.

2. A method according to claim 1, wherein a pulsing movement is applied to said suspension in combination with said rotational movement.

3. A method according to claim 1, wherein the dry process consists of subjecting all the fibres to a rotary movement about an axis which is substantially horizontal in order to induce, within the mass of fibres, a combined rolling and dropping movement which causes the formation of individualised fibrous masses.

4. A method according to claim 1, wherein the concentration of fibrous masses in said suspension is between 2 and 20% by weight.

5. A method according to claim 4, wherein the concentration of fibrous masses in said suspension is between 2 and 10% by weight.

6. A method according to claim 4, wherein the concentration of fibrous masses in said suspension is between 8 and 20% by weight so that the granules obtained are relatively dense.

7. A method according to claim 1 comprising the additional step of classifying material treated by the dry process in order to separate fibrous masses, most suitable in size for the wet process, from free fibres and fibrous masses which are too large, the free fibres and fibrous masses which are too large being recycled to the dry process with new fibres after excessively large fibrous masses are broken up.

8. A method according to claim 1 comprising the additional step of adding to said suspension fibres which are more noble than those subjected to the dry process.

9. A method according to claim 1, wherein a charge of fiber is added to said suspension.

10. A method according to claim 1, wherein a bonding agent is added to said suspension.

11. A method according to claim 1, wherein an adjuvant is added to said suspension.

12. A method according to claim 1, wherein a colouring agent is added to said suspension.

References Cited
UNITED STATES PATENTS

| | | | |
|---|---|---|---|
| 2,892,689 | 6/1959 | Rushford | 18—1A |
| 3,151,368 | 10/1964 | Dietert | 18—1A |

FOREIGN PATENTS

| | | |
|---|---|---|
| 1,422,835 | 1/1964 | France. |

ROBERT F. WHITE, Primary Examiner

J. R. HALL, Assistant Examiner

U.S. Cl. X.R.

264—117